Sept. 2, 1958  C. B. STAPLETON  2,849,802
APPARATUS FOR MEASURING EFFECTIVE DIMENSIONS OF SPLINES
Filed Dec. 23, 1954  3 Sheets-Sheet 1

INVENTOR
CLARENCE B. STAPLETON
BY
ATTORNEYS

Sept. 2, 1958 C. B. STAPLETON 2,849,802
APPARATUS FOR MEASURING EFFECTIVE DIMENSIONS OF SPLINES
Filed Dec. 23, 1954 3 Sheets-Sheet 2
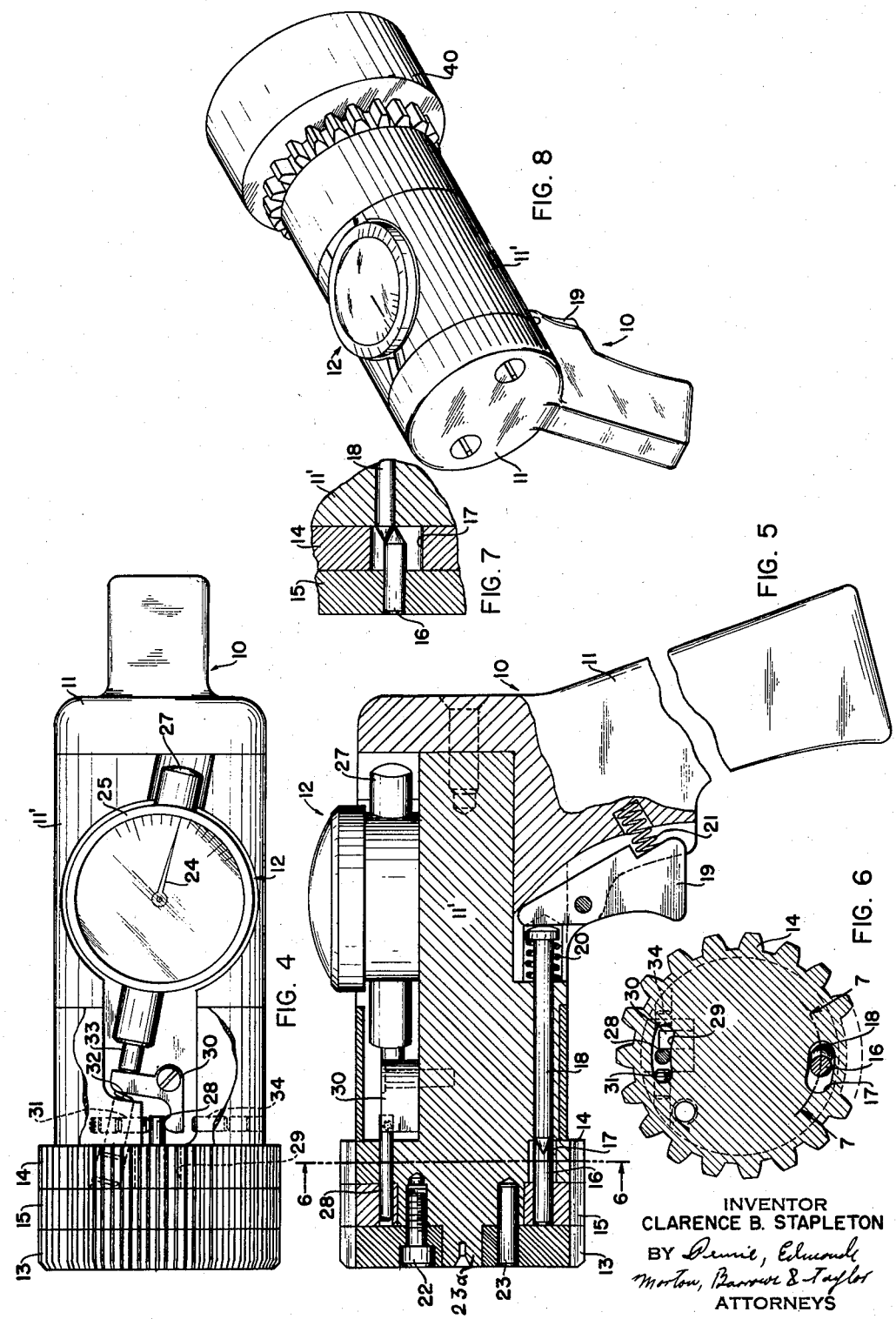
INVENTOR
CLARENCE B. STAPLETON
BY
ATTORNEYS Sept. 2, 1958  C. B. STAPLETON  2,849,802
APPARATUS FOR MEASURING EFFECTIVE DIMENSIONS OF SPLINES
Filed Dec. 23, 1954  3 Sheets-Sheet 3
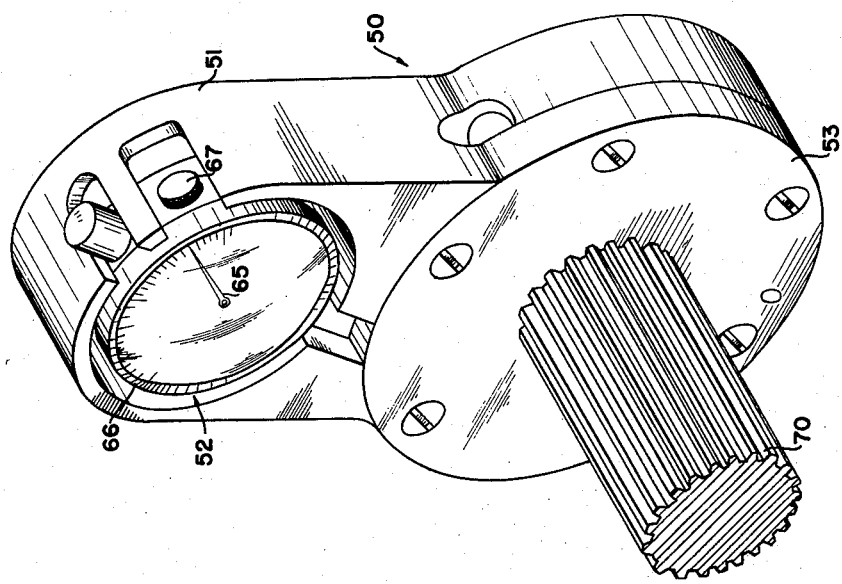
INVENTOR
CLARENCE B. STAPLETON
BY
ATTORNEYS

United States Patent Office 2,849,802
Patented Sept. 2, 1958

2,849,802

APPARATUS FOR MEASURING EFFECTIVE DIMENSIONS OF SPLINES

Clarence B. Stapleton, Royal Oak, Mich., assignor to Vinco Corporation, Detroit, Mich., a corporation of Michigan Application December 23, 1954, Serial No. 477,255

8 Claims. (Cl. 33—179.5)

This invention relates generally to an indicator type spline gauge and to a method for using such a gauge to measure both internal and external splines. In particular, the invention relates to an apparatus and method for measuring the effective dimensions of both internal and external splines. Splines are toothed structures designed to provide for a multiplicity of bearing surfaces for determining and maintaining under load a desired relative angular relationship about a common axis between a shaft and a collar surrounding the shaft. Since such a structure necessarily has more than one locating surface, it violates a cardinal rule of machine design which requires that multiple locating surfaces are to be avoided whenever possible. In order to meet the problem of multiple location when producing mating splines, it is necessary to adopt a system of dimensioning which is peculiar to splines. The dimensioning system adopted for determining the fit between mating internal and external splines has been termed "effective" dimensioning so that the terms used for defining various dimensions of splines are: effective space width, effective tooth thickness, effective clearance and effective error.

Production splines have a variety of errors caused by manufacturing difficulties but only the following have any bearing on this discussion. They are: variations in space width, accumulation of spacing errors, profile errors and errors in parallelism and roundness. The combination of these errors is called interference error. All or any of these errors may be present in a spline. The interference error subtracted from the actual space width of a spline hole establishes effective space width of the splined hole. The interference error added to the actual tooth thickness of the spline shaft establishes effective tooth thickness of the spline shaft. The fit of two mating members depends upon the effective space width of the splined hole and the effective tooth thickness of the spline shaft. If these two dimensions are equal, a metal to metal fit at two or more spots can be expected even if the actual space width of the splined hole is larger than the actual tooth thickness of the splined shaft. If the effective space width is greater than the effective tooth thickness of the mating member, backlash results. The reverse condition within specified limits produces press fit between the mating parts.

Heretofore, the maximum and minimum effective limits of tooth thickness and space width of splines was determined by go and no go gauges. Thus, a production spline shaft was checked to determine if the effective tooth thickness came within the allowable limits by inserting the shaft into a splined ring made to the maximum allowable dimensions in order to take all errors in tooth thickness of the production shaft up to the allowable limit. Such a splined ring is called a go gauge. A corresponding no go gauge was used to determine the minimum allowable effective tooth thickness and consisted of a splined ring made to the minimum allowable tooth thickness. If the production spline shaft could not be inserted in the no go gauge but could be inserted in the go gauge, then it was known that the effective tooth thickness came within the allowable maximum and minimum limits. Production splined holes or internal splines were checked in a similar manner by go and no go plug gauges in which the go plug gauge was made to the minimum allowable space width and the no go gauge to the maximum allowable space width. While such a system of gauging indicated whether a particular production spline came within the range of allowable effective limits, it did not indicate whether there was error from the theoretical perfect dimension or, as is usually the case, whether the error was greater or less than the perfect dimension. It is therefore an object of this invention to provide for a method and apparatus wherein the exact variance in either the effective tooth thickness of an external spline or the variance in the effective space width of an internal spline may be accurately and easily measured in order to determine if the mating external and internal splines come within the required tolerances of backlash.

Broadly, I propose to have an indicator type spline gauge with a movable dial face and a movable pointer in which there are two toothed members complementary to the spline to be checked associated with a third movable and toothed member also complementary to the spline to be checkeed. These toothed members, which we will hereinafter, for convenience, call "measuring cogs," are of slightly different size from a theoretical spline that would mate perfectly with a master spline corresponding to the spline to be checked. Means are provided on the gauge so that initially the teeth of all three measuring cogs may be lined up. These cogs are then mated with a master spline complementary to the spline to be checked and the indicator dial face is turned to read zero. This reading is then equivalent to the specified effective dimensions, either of the tooth thickness or of the space width for the spline depending on whether an external or internal spline is being checked. The master spline is then removed and the production spline brought into mating contact with the three measuring cogs. The pointer of the dial will then read the variance in effective dimension by which the production spline differs from the master spline so that backlash may be accurately calculated.

Referring to the drawings:

Fig. 4 is a plan view of an indicator gauge constructed according to my invention for measuring the effective space width of internal splines;

Fig. 5 is a side cross section of the gauge of Fig. 4;

Fig. 6 is a cross section of the gauge taken along line 6—6 of Fig. 5;

Fig. 7 is a cross-sectional view of a part of the gauge taken along line 7—7 of Fig. 6;

Fig. 8 is a perspective view of the gauge showing it in mating contact with an internal splined ring;

Fig. 9 is a side sectional view of a gauge constructed according to my invention for measuring effective tooth thickness of a splined shaft;

Fig. 10 is a partial plan sectional view of the gauge taken along line 10—10 of Fig. 9; and Fig. 11 is a perspective view of the gauge of Fig. 9 showing an external spline inserted for measurement.

Figure 1:
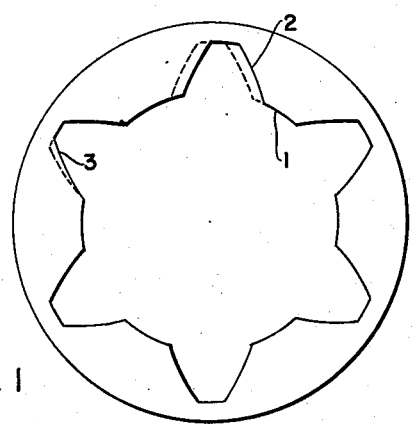
Fig. 1 shows an imperfect splined hole.

Referring to Fig. 1, 1 is a splined hole having 6 splined spaces of equal size, one of which, 2, is located or spaced incorrectly and one, 3, with a definite form or a profile error. The splined spaces of a theoretical splined hole are denoted by the dotted lines.

Figure 2:
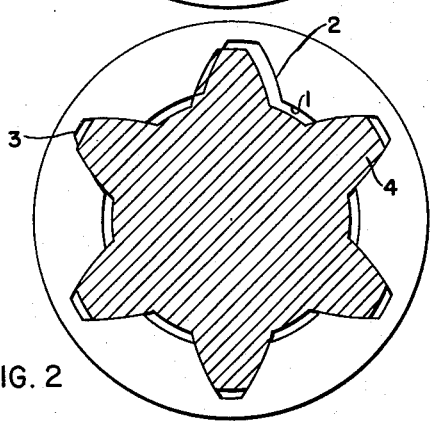
Fig. 2 shows a perfect splined shaft inserted into the splined hole of Fig. 1.

Fig. 2 shows that a perfect splined shaft 4 without spacing or form error does not match and therefore will not readily enter the splined hole 1 due to interference error, although each tooth of the shaft has the same size as the corresponding space width of the mating piece. To allow the splined shaft to enter in any position, the thickness of its teeth must be reduced by the amount of the interference as shown in Fig. 2. The actual space width of the splined hole taken along the pitch diameter less this interference determines the space width available for a mating shaft and is called the effective space width.

Figure 3:
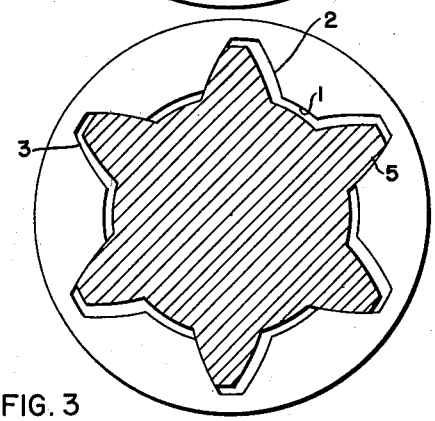
Fig. 3 shows a splined shaft designed to the effective space width of the splined hole of Fig. 1.

In Fig. 3 there is shown a splined shaft 5 corrected for the interference as shown in Fig. 2 so that it may fit into the splined hole 1. Such a shaft is said to be designed to the effective space width of the splined hole and the thickness of its teeth at the pitch diameter is its effective tooth thickness.

It is really apparent from a study of Figs. 1, 2 and 3, that backlash between the mating parts is determined by the effective clearance which is equal to the effective space width of the internal spline minus the effective tooth thickness of the external spline. Thus, by knowing the true values of the effective dimensions of both production internal and production external splines, it is easy to determine if they will mate within the allowable limits of backlash.

It is to be remembered, however, that the illustrations shown in Figs. 1, 2 and 3 show only two errors in the splined hole. In reality, splines have a variety of errors leading to interference caused by manufacturing difficulties, but only variations in space width, accumulation of spacing errors, profile errors in parallelism and roundness have any bearing on this discussion.

Referring to Fig. 5, 10 denotes generally an indicator type spline gauge constructed according to my invention for measuring the effective space width of internal splines. The gauge comprises a housing 11 having a base 11' on which is mounted a dial indicator 12, a fixed measuring cog 13, a fixed measuring cog 14 and a movable measuring cog 15. Measuring cogs 13, 14 and 15 are made to correspond to a go gauge for the spline to be checked so that they, in effect, can be inserted into a splined ring having minimum effective space width. A cone point pin 16 is firmly fastened to cog 15 and passes through a slot 17 in cog 14 to engage a second cone pin 18 slidably carried in the housing 11. Trigger 19 contacts an end of pin 18 and is kept in continual contact therewith by means of a spring 20 which biases the pin 18 towards the trigger. A second spring 21 continually forces trigger 19 in a direction away from pin 18.

Measuring cog 13 is held to base piece 11' by a cap screw 22 and is kept in perfect alignment with cog 14 by means of pin 23 and hub 23a of the base piece.

Cone pins 16 and 18 and slot 17 are so arranged that when trigger 19 is depressed, that the movable cog 15 will rotate in a clockwise direction when the gauge is observed from the cog mounted end.

Indicator gauge 12 has a pointer 24, a movable dial face 25 and a knob 27 for moving said dial face. Attached to movable cog 15 is an indicator pin 28 which is carried on the opposite side of the cog from the cone pin 16. Indicator pin 28 extends through a slot 29 in the stationary cog 14 and contacts a bell crank 30 on one side and a set screw 31 on the other side. A spring 32 forces the bell crank 30 against a rod 33 which is in turn connected to the dial indicator mechanism. Spring 32 also forces by way of crank 30 and pin 28, movable cog 15 in a counterclockwise direction. Counterclockwise movement of the cog is limited by set screw 31. A second set screw 34 limits clockwise movement of the cog and is so arranged that when crank 30 contacts it, that the movable cog will be in perfect alignment with cogs 13 and 14.

The operation of the gauge is as follows: trigger 19 is depressed in order to turn measuring cog 15 clockwise until crank 30 contacts set screw 34. At this point the teeth of cog 15 are lined up with those of measuring cogs 13 and 14. The cogs are then inserted into a master spline 40 which is a master of the production spline while at the same time still keeping the trigger depressed. The trigger is then released thus allowing the cog 15 to rotate under the influence of spring 32 in a clockwise direction until its teeth contact the teeth of the master spline. Rotatable dial face 25 is then rotated by knob 27 until pointer 24 points to the zero mark. Rotatable cog 15 will then be in the theoretical perfect location where it should be if a production spline into which it is inserted is perfectly made so that any deviation from this spot will be indicated on the dial face. The gauge is then withdrawn from the master spline and inserted in the production spline. Any variance of the indicator from the zero mark will then indicate the exact effective space width variance of the production spline. Of course if the pointer stands at zero, then the production piece is an exact duplicate of the master spline. The measurement referred to is made on the pitch line of the internal spline and since the acting point of the indicator (where rod 33 contacts crank 30) is further away from the center of the spline than the pitch line, the graduations on the face of the indicator dial must either be corrected or corrective factors from a conversion table must be supplied.

Referring now to Figs. 9, 10 and 11, there is shown a gauge constructed to the same basic principles as the gauge shown in Figs. 4 through 8, except that the gauge is adapted to measure external splines. The gauge, denoted generally by the numeral 50, consists of a housing 51 supporting a dial 52, fixed aligned measuring cogs 53 and 54, and a rotatable measuring cog 55. Cogs 53, 54 and 55 are made slightly over-size so that they may accept a splined shaft that may be slightly over-size. These measuring cogs are equivalent to a go ring gauge and so are made to admit a spline shaft having the maximum allowable effective tooth thickness.

A plunger 56 is situated in a slot in the housing and contacts on one of its ends a shoulder mounted on the movable cog 55. A spring 57 forces the plunger away from this shoulder. A stop 58 bears on the opposite side of the shoulder from plunger 56 so that when plunger 56 is depressed, the cogs 53, 54 and 55 will be perfectly lined up. A second stop 59 limits rotation in the clockwise direction as seen in Fig. 10 of the cog 55 caused by the action of a spring 60 bearing on another shoulder of the cog.

Dial indicator 52 has an indicator pointer 65, and a movable dial face 66 which is clamped by a knob 67. Plunger 68 is connected to the dial mechanism and is forced into contact with a shoulder on cog 55 by means of a spring 69.

The operation of this gauge is similar to that of the gauge for measuring the effective width of internal splines. The plunger 56 is initially depressed in order to line up the teeth of measuring cog 55 with those of measuring cogs 53 and 54. A master spline shaft 70 which is a master of the production spline, is inserted in the gauge while still keeping the plunger depressed. The plunger 56 is then released allowing spring 60 to rotate the cog 55 clockwise until it contacts the teeth of the splined shaft 70. The cog 55 will then be in the perfect position for a splined shaft made to the theoretical perfect dimensions desired so that any movement from this position will be indicated upon the dial. The dial face 66 is then rotated by knob 67 until pointer 65 points to the zero mark. The master spline 70 is then removed from from the gauge and the production spline inserted in place thereof. Any variance of the pointer from zero will then establish the exact effective tooth thickness variance of the production spline from a master spline. As in the gauge for measuring effective tooth thickness, the measurement referred to on this gauge is taken on the pitch line of spline shaft, and, since the acting point of the indicator (point of contact of shaft 68 on the shoulder mounted on the movable cog) is further away from the center of the spline than the pitch line, the graduations on the face of the dial indicator must therefore either be corrected or corrective factors from a conversion table must be supplied.

It is obvious that slight changes in structure of the gauges may be made and still be within the scope of my invention. For example, in both embodiments of the invention it is not absolutely necessary that the dial face be movable. Notation could be made of the dial reading when either gauge was in engagement with its master spline and variations from this reading when the gauge was in engagement with a production spline would indicate the exact variance from the theoretical perfect of the effective tooth thickness or effective space width.

I claim:

1. An indicator type spline gauge for comparing the effective dimensions of a production spline with the corresponding dimensions of a master spline including at least one stationary measuring cog, at least one movable measuring cog positioned coaxially with said stationary measuring cog, said cogs being complementary in shape to said master spline, of slightly different size than that to give perfect mating fit with said master spline, and of a size equal to give a limit fit with a production spline, means for bringing the teeth of said stationary cog and the teeth of said movable cog into mutual alignment, a dial indicator having a movable pointer and means for transmitting motion of said movable cog relative to said stationary cog to actuate said pointer.

2. An indicator type spline gauge for comparing the effective dimensions of a production spline with the corresponding dimensions of a master spline, comprising a housing, two stationary measuring cogs coaxially mounted on said housing and shaped complementary to said spline, a movable measuring cog mounted on said housing coaxially to and between said stationary cogs and shaped complementary to said spline said cogs being of slightly different size than to give perfect mating fit with said master spline and said size being equal to give a limit fit with a production spline, means for bringing the teeth of said cogs into mutual alignment, a dial indicator having a movable dial face and a movable pointer mounted on said housing and means for transmitting relative motion of said movable cog to said stationary cogs to actuate said pointer.

3. An indicator type spline gauge for comparing the effective tooth thickness of a production splined shaft with the corresponding tooth thickness of a master splined shaft, comprising a housing having coaxially mounted thereon at least one movable internally toothed measuring cog, at least one stationary internally toothed measuring cog, a dial indicator having a movable pointer, and means for transmitting motion of said movable cog relative to said stationary cog to actuate said pointer; said movable cog and said stationary cog being of a slightly larger size than necessary to give perfect mating engagement with said master splined shaft and equal in size to a "go" gauge for said spline shaft.

4. An indicator type spline gauge according to claim 3 wherein there are at least two stationary internally toothed measuring cogs with said movable internally toothed measuring cog being positioned therebetween.

5. An indicator type spline gauge according to claim 3 wherein said dial indicator has a movable dial face.

6. An indicator type spline gauge for comparing the effective space width of an internally splined hole with the corresponding space width of a master internally splined hole, comprising a housing having coaxially mounted thereon at least one movable externally toothed measuring cog, at least one stationary externally toothed measuring cog, a dial indicator having a movable pointer, and means for transmitting motion of said movable cog relative to said stationary cog to actuate said pointer; said cogs being of a slightly smaller size than necessary to give perfect mating engagement with said master splined hole and equal in size to a "no-go" gauge for said splined hole.

7. An indicator type spline gauge according to claim 6 wherein there are at least two stationary externally toothed measuring cogs with said movable externally toothed measuring cog being positioned therebetween.

8. An indicator type spline gauge according to claim 6 wherein said dial indicator has a movable dial face.

References Cited in the file of this patent

UNITED STATES PATENTS

| | | |
|---|---|---|
| 1,154,620 | Eitner | Sept. 28, 1915 |
| 1,259,196 | Ames | Mar. 12, 1918 |
| 1,422,576 | Humphreys | July 11, 1922 |
| 1,425,193 | Gates | Aug. 8, 1922 |
| 1,874,517 | Hartness | Aug. 30, 1932 |
| 2,440,967 | Moore | May 4, 1948 |
| 2,445,184 | Parker | July 13, 1948 |
| 2,555,496 | Mackmann | June 5, 1951 |
| 2,561,533 | Parker | July 24, 1951 |
| 2,561,534 | Parker | July 24, 1951 |
| 2,580,949 | Parker | Jan. 1, 1952 |
| 2,665,136 | Fallon | Jan. 5, 1954 |
| 2,723,459 | Stapleton | Nov. 15, 1955 |

FOREIGN PATENTS

| | | |
|---|---|---|
| 601,612 | Germany | Aug. 20, 1934 |